3,692,707
PREPOLYMERS AND FIRE RETARDANT POLYURETHANES THEREFROM
Ronnie M. Pruit and Howard D. Jones, Lake Jackson, Tex., assignors to The Dow Chemical Company, Midland, Mich.
No Drawing. Filed Aug. 19, 1970, Ser. No. 65,242
Int. Cl. C08g 22/18, 22/48
U.S. Cl. 260—2.5 AJ    11 Claims

ABSTRACT OF THE DISCLOSURE

Novel halogen or phosphorus-containing prepolymers are employed to prepare polyurethane compositions having improved fire retardant properties.

---

This invention relates to novel halogen or phosphorus-containing isocyanate compositions and to polyurethane compositions prepared therefrom.

Polyurethanes have in the past been prepared from halogen- or phosphorus-containing polyols in admixture with non-halogen or non-phosphorus-containing polyols and polyisocyanates for the purpose of rendering the resultant polyurethane composition fire retardant.

It has now been unexpectedly discovered that polyurethane compositions prepared from a prepolymer which is the reaction product of a phosphorus or halogen containing polyol and an excess of a polyisocyanate and a non-halogen-containing or non-phosphorus-containing polyol, have improved fire retardant properties and in some instances, the physical properties are additionally improved.

Suitable halogen-containing polyols which may be reacted with a polyisocyanate to prepare the halogen-containing prepolymers of the present invention include halogen-containing aliphatic or aromatic polyols containing 2 or more active hydrogen atoms and the vicinal alkylene oxide derivatives thereof. Such suitable halogen-containing compounds include, for example, dibromoneopentyl glycol, dichloroneopentylglycol, chlorobromoneopentylglycol, p,p' - isopropylidenedi(dibromophenol), 2,3-dibromobutanediol, halogenated aromatic polyols such as the brominated novolacs (bromine substituted phenolaldehyde products) having a functionality of from about 2.1 to about 5, the ethylene oxide adducts, 1,2-propylene oxide adducts, 1,2-butylene oxide adducts, 2,3-butylene adducts or mixed vicinal alkylene oxide adducts of such halogen-containing polyols, and the like. Mixtures of such halogen-containing polyols may likewise be employed.

Suitable phosphorus-containing polyols which may be reacted with a polyisocyanate to prepare the phosphorus-containing prepolymers of the present invention include the vicinal alkylene oxide adducts of a phosphorus-containing compound having 2 or more active hydrogen atoms. Such suitable phosphorus-containing compounds include, for example, the ethylene oxide, 1,2-propylene oxide, 1,2-butylene oxide or mixed 1,2-alkylene oxide adducts of phosphoric acid, and the like.

Suitable polyisocyanates which may be reacted with the halogen- or phosphorus-containing polyols are those containing at least 2 NCO groups per molecule which include, for example, hexamethylene-diisocyanate, tolylene 2,4- or tolylene 2,6-di-isocyanate, diphenyl methane diisocyanate, m-phenylene diisocyanate, p-phenylene diisocyanate, naphthalene diisocyanate, dimethyl diphenyl methanediisocyanate, dianisidine diisocyanate and "PAPI," polymethylene polyphenyl-isocyanate), having the general formula

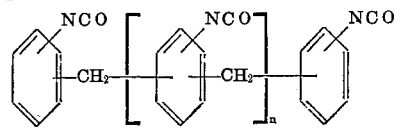

wherein n has an average value of about 0.6 or mixtures of any two or more of such isocyanates.

The novel halogen or phosphorus-containing prepolymers of this invention are prepared by reacting such polyol with the polyisocyanate defined herein in the presence of a suitable catalyst usually employed in the preparation of prepolymers such as stannous octoate in proportions such that the NCO:active hydrogen ratio is at least about 2:1, and is generally in the range of from about 2:1 to about 9:1 and preferably from about 7.76:1 to about 8:1.

Suitable compounds which may be reacted with the novel prepolymers of this invention to form useful fire retardant polyurethane compositions include, for example, the phosphorus and halogen-containing polyols from which the novel prepolymers were prepared, the condensates of a lower alkylene oxide, or an epihalohydrin or mixtures thereof with a polyhydric compound having from about 2 to about 8 active hydrogen atoms such as, for example, polyhydric alcohols, alkylene polyamines, carbohydrates, and mixtures thereof (said compounds having a hydroxyl equivalent weight of from about 80 to about 2500).

The polyether polyols employed in the present invention may be either block condensates wherein any of the lower alkylenes oxides and/or epihalohydrins are condensed with the polyhydric compound, alternating block condensates wherein two or more of the lower alkylene oxides and/or epihalohydrins are condensed alternately in any order with the polyhydric compound or heteric condensates wherein a mixture of lower alkylene oxides and/ or epihalohydrins is condensed with the polyhydric compound or a combination block and heteric condensate wherein a mixture of lower alkylene oxides and/or epihalohydrins are condensed with a previously prepared block condensate.

Suitable lower alkylene oxides include, for example, those containing from 2 to 4 carbon atoms such as ethylene oxide, propylene oxide, 1,2-butylene oxide, 2,3-butylene oxide and the like.

Suitable epihalohydrins include, for example, epichlorohydrin, epibromohydrin, epiodohydrin and the like.

Suitable polyhydric alcohols include, for example, ethylene glycol, propylene glycol, neopentyl glycol, 1,4-butane diol, glycerol, trimethylolpropane, pentaerythritol, hexanetriol and the like.

Suitable carbohydrates include for example, hexitol, heptitol, sorbitol, manitol, sucrose and the like.

Suitable alkylene polyamines include, for example, ethylenediamine, propylenediamine, butylenediamine, pentamethylenediamine, hexamethylenediamine and the like.

The novel fire retardant polyurethane compositions of the present invention may be cellular or noncellular and are prepared by reacting the novel phosphorus or halogen-containing prepolymers of the present invention with a compound containing a plurality of active hydrogen atoms in proportions such that the NCO:active hydrogen atom ratio is from about 0.85–1.25 and preferably from about .95 to about 1:10 in the presence of suitable catalysts for urethane formation. Such catalysts for urethane formation include, for example, tertiary amines of which triethylenediamine and N-ethylmorpholine are typical examples.

Tin salts are also employed as catalysts, normally in addition to a suitable tertiary amine catalyst. Suitable tin catalysts include, for example, stannous octoate, stannous oleate, dibutyl tin dilaurate and the like.

Where urethane foams are to be prepared, other catalysts such as metal soaps, including, for example, lead naphthenate, zinc naphthenate, aluminum distearate, aluminum tristearate, plumbous stearate, plumbous stearate (basic), aluminum monostearate, zinc stearate, cadmium stearate, silver acetate, lead pelargonate and the like may be employed. These catalysts are discussed more fully in U.S. Pat. No. 3,391,091.

In the preparation of cellular polyurethanes, which include flexible, semi-flexible and rigid foams, foaming agents are employed which include water, hydrocarbons boiling below about 110° C. and halogenated hydrocarbons boiling below about 110° C. such as those described in U.S. Pat. No. 3,072,582.

Silicone oils are normally employed as cell control agents as an aid in the formation of the cell structure during the actual foaming. These oils are commercially available products and include, for example, those sold by Dow Corning Corporation as DC 190 and the like and by Union Carbide Corporation as L–520 and the like.

Polyoxypropylene glycols having an average molecular weight of from about 2000 to about 4000 may be employed either alone or in combination with the silicone oils, as the cell control agent in rigid polyurethane foams.

In addition to the above, other inert ingredients such as fillers, dyes and the like may be employed in the polyurethane formulations contemplated by the present invention.

The following examples are illustrative of the present invention and are not to be construed as limiting the scope thereof in any manner.

In the following examples, all parts are by weight unless otherwise indicated.

EXAMPLE 1

(A) A prepolymer was prepared by reacting 442 grams of toluene diisocyanate (80/20 mixture of 2,4- and 2,6-isomers) with 132 grams of 2,2-bis(bromomethyl)-1,3-propane diol. The resultant prepolymer had a percent Br of 13.9 and a percent NCO of 31.2.

(B) A flexible polyurethane foam was prepared by mixing together all the ingredients in the following recipe except the prepolymer prepared in (A) above and then mixing the resultant mixture with the prepolymer. The final mixture was then poured into a container and allowed to rise freely.

Recipe 100 parts of CP 3000 (a commercially available polyoxypropylene triol having an average molecular weight of about 3000) [1]
3 parts water
.25 part stannous octoate
.30 part bis(dimethylethylamino)ether
.25 part DC–190 silicone oil [2]
58.5 parts (100 isocyanate Index) of the prepolymer prepared in (A) above.

[1] Having the following properties:
Percent hydroxyl _____ 1.62–1.79
Percent water, max. _____ 0.10
pH (1 H₂0/10 methanol) _____ 7.0–9.0
Acid No. (MgKOH/g.) max. _____ 0.05
APHA color, Max. _____ 50
Density, lbs./gal. @ 77° F. _____ 8.3980
Specific gravity, 77°/77° F. _____ 1.0093
Refractive Index, 77° F. _____ 1.452
Viscosity, cks. @ 77° F. _____ 450

[2] Having the following properties:
Viscosity at 77° F. _____ 1000 to 1500.
Specific gravity @ 77° F. ____ 1.035.
Refractive Index @ 77° F. ____ 1.4480.
Color, Gardener Scale _____ 1 to 4.
Water solubility _____ Completely soluble.
Pour point, ° F. _____ −40.

The resultant foam contained 5.0% bromine and was rated S.E. with a burn of 1 inch by ASTM D 1692 67T.

(C) For comparative purposes, a polyurethane foam was prepared from 2,2-bis(bromomethyl) 1,3-propane diol employing the following recipe and procedure of B above except that toluene diisocyanate was employed instead of the prepolymer prepared in (A).

80 parts CP 3000
20 parts 2,2-bis(bromomethyl) 1,3-propane diol
3.0 parts water
0.5 part DC 190 silicone oil
0.05 part stannous octoate
0.4 part bis(dimethyl aminoethyl)ether
51.6 parts toluene diisocyanate (80/20 mixture of 2,4- and 2,6-isomers, respectively).

The resultant foam contained 7.96% bromine and was rated burning by ASTM D–1692 67T.

EXAMPLE 2

(A) A prepolymer was prepared by reacting 675 grams of toluene diisocyanate (80/20 mixture of 2,4- and 2,6-isomers respectively) with 271.9 grams of p,p'-isopropylidene di(dibromophenol). The resultant prepolymer had an NCO content of 32.3% and a bromine content of 16.9%.

(B) A flexible polyurethane foam was prepared from the above prepared prepolymer employing the following recipe and the procedure of Example 1–B.

100 parts CP 4701 (a commercially available polyoxypropylene triol encapped with ethylene oxide and having a molecular weight of about 4700.) [1]
2.5 parts water
3.0 parts triethylenediamine
0.5 part bis(dimethylethylamino)ether
52.0 parts prepolymer from (B) above.

[1] Having the following properties:
Percent hydroxyl _____ 0.96–1.10
Percent water, max. _____ 0.1
pH (1 H₂0/10 methanol) _____ 7.0–9.5
Acid No. (mg. KOH/g.) max. _____ 0.05
Unsaturation (meq./g.) max. _____ 0.1
APHA color. max. _____ 50
Density, lbs./gal. @ 77° F. _____ 8.4956
Specific gravity 77/77° F. _____ 1.0210
Refractive Index, 77° F. _____ 1.4532
Viscosity, cks. @ 77° F. _____ 860

The resultant foam has a bromine content of 5.56% and was rated S.E. with a burn length of 1½ inches by ASTM D 1692 67T.

(C) For comparative purposes, a foam was prepared from the p,p'-isopropylidine di(dibromophenol) employing the following recipe and the procedure of Example 1–C.

80 parts CP 3000
20 parts p,p'-isopropylidene di(dibromophenol)
3.0 parts water
0.3 part stannous octoate
0.25 part bis(dimethylaminoethyl)ether
42 parts toluene diisocyanate (80/20 mixture of 2,4- and 2,6-mixed isomers respectively)

The resultant foam had a bromine content of 8.08% and was rated burning by ASTM D 1692 67T.

EXAMPLE 3

(A) A prepolymer was prepared by reacting 121 grams of the reaction product of 1 mole of phosphoric acid with 3 moles of propylene oxide with 428 grams of toluene diisocyanate (80/20 mixture of the 2,4- and 2,6-isomers respectively). The prepolymer had a phosphorus content of 2.04% and an NCO content of 30%.

(B) A flexible polyurethane foam was prepared from the prepolymer of A above employing the following recipe and the procedure of Example 1–B.

100 parts of a commercially available 6000 molecular weight polyoxypropylene encapped with ethylene oxide
2.5 parts water
2.0 parts 33% solution of triethylenediamine in dipropylene glycol
43 parts of the prepolymer from A above.

The resultant foam had a phosphorus content of 0.508% and was rated S.E. with a burn length of 1½ inches by ASTM D 1692 67T.

(C) For comparative purposes, a flexible polyurethane foam was prepared from the reaction product of 1 mole of phosphoric acid and 3 moles of propylene oxide employing the following recipe and the procedure of Example 1–C.

100 parts of a mixture of CP 3000 and the reaction product of 1 mole of phosphoric acid and 3 moles of propylene oxide in such proportions that the mixture contained about .94% phosphorus by weight
3.75 parts water
1.0 part DC 190 silicone oil
0.10 part triethylenediamine
.20 part N-ethyl morpholine
.06 part stannous octoate
53.8 parts toluene diisocyaante (80/20 mixture of the 2,4- and 2,6-isomers respectively)

The resultant foam had a phosphorus content of 0.59% and was rated burning by ASTM D 1692 67T.

EXAMPLE 4

(A) A prepolymer was prepared by reacting 420 grams of polymethylene polyphenylisocyanate having an NCO equivalent weight of about 133 with 90.8 grams of the reaction proudct of 2,2-bis(bromomethyl) 1,3-propanediol with about 6 moles of propylene oxide. The resultant prepolymer had a percent Br of 4.57 and a percent NCO of 23.6.

(B) A rigid polyurethane foam was prepared from the prepolymer of A above employing the following recipe and the procedure of Example 1–B.

316.0 grams of the reaction product of amino-ethyl-ethanolamine with propylene oxide to an OH equivalent weight of about 113.
8.3 grams of DC 113 silicone oil [1]
0.08 gram of dibutyltindilaurate
153.0 grams trichloromonofluoromethane
510.0 grams of the prepolymer prepared in A above.

[1] Having the following properties:
  Color _____ Light straw.
  Viscosity @ 77° F., cks. ____ 350.
  Specific gravity @ 77° F. ___ 1.07.
  Acid No. _____ <0.1.
  Hydroxyl content, percent __ 1.5.
  Water solubility _____ Completely soluble.

The resultant rigid polyurethane foam had a bromine content of 2.8% and was rated S.E. with a burn rate of 1.2" in 43.9 sec. by ASTM D 1692 67T.

(C) For comparative purposes, a rigid polyurethane foam was prepared from an amine polyol in admixture with a bromine containing polyol employing the following recipe and the procedure of Example 1–C.

316.0 grams of the reaction product of aminoethylethanolamine with propylene oxide to an OH equivalent weight of about 113.
90.8 grams of reaction product of 2,2-bis(bromomethyl) 1,3-propanediol with about 6 moles of propylene oxide, said product having an OH equivalent weight of about 302.
8.3 grams of DC 193 silicone oil
0.08 gram of dibutyltindilaurate
153.0 grams of trichloromonofluoromethane
420.0 grams of polymethylenepolyphenylisocyanate (NCO equivalent weight of about 133)

The resultant rigid polyurethane foam had a bromine content of 2.8% and was rated S.E. with a burn rate of 2.8" in 44.4 sec. by ASTM D 1692 67T.

What is claimed is:

1. A prepolymer suitable for preparing fire retardant polyurethanes prepared by reacting a polyisocyanate with a halogenated compound containing a plurality of hydroxyl groups selected from brominated novolacs having a functionality of from about 2.1 to about 5, p,p'-isopropylidine di(dibromophenol), dibromoneopentyl glycol, dichloroneopentyl glycol, chlorobromoneopentyl glycol, mixtures thereof and the ethylene oxide adducts, 1,2-propylene oxide adducts, 1,2-butylene oxide adducts, 2,3-butylene oxide adducts or the mixed alkylene oxide adducts thereof wherein the NCO:active hydrogen ratio is from about 2:1 to about 9:1.

2. The prepolymer of claim 1 wherein the halogenated compound containing a plurality of hydroxyl groups is dibromoneopentyl glycol.

3. The prepolymer of claim 2 wherein the polyisocyanate is toluene diisocyanate.

4. The prepolymer of claim 2 wherein the polyisocyanate is toluene diisocyanate.

5. The prepolymer of claim 1 wherein the halogenated compound containing a plurality of hydroxyl groups is p,p'-isopropylidine di(dibromophenol).

6. A polyurethane foam composition comprising the reaction product in the presence of a foaming agent of
    (A) a prepolymer of claim 1, and
    (B) a compound having a plurality of active hydrogen atoms;
the proportions of (A) and (B) being such that the NCO:active hydrogen ratio is from about 0.85:1 to about 1.25:1.

7. The polyurethane composition of claim 6 wherein the prepolymer is the reaction product of toluenediisocyanate and dibromoneopentyl glycol.

8. The composition of claim 6 wherein the prepolymer is the reaction product of toluenediisocyanate and p,p'-isopropylidene di(dibromophenol).

9. The composition of claim 6 wherein the prepolymer is the reaction product of dibromoneopentyl glycol and polymethylenepolyphenylisocyanate.

10. The polyurethane composition of claim 6 in the form of a flexible cellular product.

11. The polyurethane composition of claim 6 in the form of a rigid cellular product.

References Cited

UNITED STATES PATENTS 3,375,224  3/1968  Cordier _____ 260—471 C

FOREIGN PATENTS 6601266  8/1966  Netherlands ____ 260—77.5 AM
6516834  6/1966  Netherlands _____ 260—2.5 AJ
1,550,101  12/1968  France _____ 260—2.5 AP

OTHER REFERENCES

Chemical Abstracts, 68: 79240p, 1968, p. 7655.
Chemical Abstracts, 68: 69450t, 1968, p. 6722, DONALD E. CZAJA, Primary Examiner C. W. IVY, Assistant Examiner U.S. Cl. X.R.

260—2.5 AM, 2.5 AN, 2.5 AP, 2.5 AT, 2.5 BD, 2.5 AR, 77.5 AM, 77.5 AR, 471 C, 482 B, 920, 938, 939

PO-1050
(5/69)

UNITED STATES PATENT OFFICE
CERTIFICATE OF CORRECTION

Patent No. 3,692,707           Dated Sept. 19, 1972

Inventor(s) Ronnie M. Pruitt and Howard D. Jones

It is certified that error appears in the above-identified patent and that said Letters Patent are hereby corrected as shown below:

Column 1, in the inventors' names, delete "Pruit" and insert --Pruitt--.

Column 2, line 37, delete "alkylenes" and insert --alkylene--.

Column 5, line 28, after the word "polyoxypropylene" insert --triol--.

In Claim 3, line 1, delete "Claim 2" and insert --Claim 1--.

Signed and sealed this 3rd day of July 1973.

(SEAL)
Attest:

EDWARD M. FLETCHER, JR.
Attesting Officer

Rene Tegtmeyer
Acting Commissioner of Patents